United States Patent Office 2,985,598
Patented May 23, 1961

2,985,598

SUPPORTED NICKEL OXIDE CATALYST AND PROCESS OF MAKING SAME

Vernon C. F. Holm, Grant C. Bailey, and Alfred Clark, Bartlesville, Okla., assignors to Phillips Petroleum Company, a corporation of Delaware No Drawing. Filed June 29, 1956, Ser. No. 594,680

5 Claims. (Cl. 252—472)

This invention relates to an improved supported nickel oxide catalyst and to a method of making same. In another aspect, this invention relates to an improved olefin polymerization process utilizing said catalyst.

The basic process of polymerizing olefins with a supported nickel oxide catalyst is disclosed in U.S. Patents 2,381,198 and 2,606,940 to G. C. Bailey et al. This process is of considerable importance in that the polymerization of low-boiling olefins to liquid products, especially the polymerization of ethylene to a liquid polymer, is especially difficult and can be effected by only a few known catalysts.

In accordance with this invention, an improvement in the maximum conversion attained by the process of the aforementioned patents is realized. This is effected by treating the catalyst support with a wetting agent, preferably applied with the solution used to impregnate the support with a nickel compound. The improved yield thereby obtainable is apparently peculiar to the nickel oxide catalyst in polymerization because no similar effect is observed by similar treatment of other catalytic materials, in particular, supported platinum platforming catalysts.

Accordingly, it is an object of the invention to provide an improved method for making a supported nickel oxide polymerization catalyst capable of increasing the yield in an olefin polymerization process.

It is a further object to provide a method of obtaining improved yields of polymers of low-boiling olefins, particularly ethylene.

It is a still further object of this invention to provide a catalyst and method which is simple, economical to operate, and provides reliable results.

Various objects, advantages, and features of the invention will become apparent from the following detailed description.

The invention resides in introducing a wetting agent during the making of a supported nickel oxide catalyst. This is most conveniently effected by impregnating the support with an aqueous nickel salt solution containing sufficient wetting agent to improve the yield when the catalyst is utilized in an olefin polymerization process. As illustrative of the amounts in which the wetting agent can be employed, a range of 0.02 to 0.5 weight percent based on the impregnating solution is suitable. In commercial operation, a more restricted range of 0.05 to 0.2 weight percent is applicable.

Suitable catalyst supports are the difficultly reducible, porous metal oxides. Natural and synthetic clays fall within this category. As specific examples, there may be mentioned kieselguhr, alumina, silica, and silica-alumina, the latter material being especially suitable in carrying out the process of the invention. Other highly absorbent, porous materials, such as charcoal, can be employed in the broader aspects of the invention.

In the catalyst preparation, the support is impregnated with a sufficient quantity of a nickel salt as to provide the desired catalytic activity. For practical purposes, the catalyst contains from 0.1 to 10 weight percent nickel, there being little increase in activity as a result of utilizing more nickel.

The nickel salt is one which can be converted to the oxide by heating to temperatures of 300 to 700° C., for example, nickel nitrate and nickel acetate. The concentration of the nickel salt in the aqueous or other impregnating solution is dependent upon the desired concentration of nickel on the finished catalyst.

Various members of the known class of wetting agents are applicable. Specific examples are alkylated aromatic ethylene oxide condensation products, sorbitan palmitates, alkali metal salts of rosin acids, alkali metal salts of alkyl half esters of sulfuric acid such as sodium lauryl sulfate, and alkali metal salts of sulfonated alkyl aromatics.

After impregnation, the base is dried and then heated to convert the nickel salt to the oxide. This can best be done in the presence of an oxygen-containing gas, such as air. Thereupon, the finished catalyst is ready for use in the polymerization process.

The monomers which can be polymerized are aliphatic monoolefins containing up to 4 carbon atoms, for example, ethylene, propylene, isobutylene, and 1-butene. The invention is especially suited to the polymerization of ethylene to liquid polymer which, as previously noted, is quite difficult.

Suitable conditions for effecting the polymerization can be found in the aforementioned Bailey et al. patents. Thus, polymerization temperatures of 50 to 150° C. are suitable, and the pressure can vary over very wide ranges, say from atmospheric or below to 2,000 p.s.i. or higher. The polymerization can be carried out with various techniques known to those skilled in the art, e.g., with a fixed bed, moving bed, or fluidized catalyst system.

Use of the present catalyst in the described polymerization process provides definitely ascertainable and important increases in the maximum conversion of the monomeric material to liquid polymers.

While we are not limited to any precise theory of operation, it is believed that the presence of the wetting agent in the impregnating solution causes the catalyst to be more uniformly distributed over the surface of the support, resulting in increased conversion.

EXAMPLE

Pellets of commercial silica-alumina cracking catalyst were broken and a 16–30 mesh fraction separated. About 50 ml. of the 16–30 mesh fraction was treated with about 75 ml. of an 0.8 molar nickel nitrate solution. After about 15 minutes, the support was drained and then dried in an evaporating dish with constant stirring. After further drying in an oven at 110° C., the catalyst was heated gradually to 500° C. in a stream of dried air and then held at this temperature for five hours to decompose the nickel nitrate to nickel oxide.

The catalyst of the present invention was made in a similar manner with the exception that the nickel nitrate impregnating solution contained 0.1 weight percent of a sodium salt of an alkyl aryl sulfonic acid as a wetting agent.

The ethylene polymerization tests were made with each catalyst using a glass reactor equipped with an axial thermocouple well that permitted temperature measurements on the catalyst bed which was supported on a perforated glass platform in the hot zone of the reactor. The reactor was mounted in a vertical tube furnace fitted with a heavy metal sleeve for temperature equalization. Dried ethylene was admitted at the top from a calibrated flowrater and the reacted mixture was passed through a trap cooled by a Dry-Ice bath below the reactor. The unreacted ethylene from the trap was passed through a second calibrated flowrater. Thus, with a given flow rate of ethylene, readings of the second flowrater made possible a satisfactory calculation of the instantaneous values for the conversion of ethylene to dimers, trimers, and higher polymers.

Prior to a run, the reactor was charged with 2 ml. of the catalyst and with a slow stream of dry nitrogen flowing, the furnace was heated to 400° C., held at this temperature for about an hour, and cooled to room temperature overnight. Then with the refrigerated receiver in place, the nitrogen was cut off and the flow of research grade ethylene started at a gaseous hourly flow rate of 2500. The furnace was turned on at a voltage to attain 300° C. in two hours. Flowrater and temperature readings were made at five minute intervals. Maximum conversion occurred at the maximum temperature, 300° C.

*Results*

| Impregnating Method | Percent Nickel on Catalyst | Percent Ethylene Polymerized Max. Conversion |
|---|---|---|
| With wetting agent | 2.64 | 58 |
| No wetting agent | 3.4 | 54 |

It can be seen from the above that higher conversion was obtained in the run with catalyst made with wetting agent.

As many possible embodiments may be made of this invention without departing from the scope thereof, it is to be understood that all matter herein set forth is to be interpreted as illustrative and not in a limiting sense.

We claim:

1. The process of making a supported nickel oxide polymerization catalyst containing at least 0.1 weight percent nickel which comprises impregnating the support with a nickel compound in the presence of a sufficient quantity of a wetting agent composed of alkali metal salts of sulfonated alkyl aromatics to improve the yield of the catalyst in an olefin polymerization process, and thereafter heating the material in the presence of an oxygen-containing gas to convert the nickel compound to the oxide.

2. A supported nickel oxide catalyst produced by the method of claim 1.

3. The method of making a supported nickel oxide catalyst containing at least 0.1 weight percent nickel which comprises contacting a silica-alumina base with an aqueous nickel nitrate solution containing 0.05 to 0.2 weight percent of an alkali metal salt of alkylated aromatic sulfonic acid, drying the impregnated support, and heating the dried support to a temperature of 300 to 700° C. to convert the nickel nitrate to the oxide.

4. The process of making a supported nickel oxide polymerization catalyst containing at least 0.1 weight percent nickel which comprises impregnating the support with a nickel compound in the presence of a sufficient quantity of a wetting agent composed of alkali metal salts of rosin acids to improve the yield of the catalyst in an olefin polymerization process, and thereafter heating the material in the presence of an oxygen-containing gas to convert the nickel compound to the oxide.

5. The process of making a supported nickel oxide polymerization catalyst containing at least 0.1 weight percent nickel which comprises impregnating the support with a nickel compound in the presence of a sufficient quantity of a wetting agent composed of alkali metal salts of alkyl half esters of sulfuric acid to improve the yield of the catalyst in an olefin polymerization process, and thereafter heating the material in the presence of an oxygen-containing gas to convert the nickel compound to the oxide.

References Cited in the file of this patent
UNITED STATES PATENTS

| | | |
|---|---|---|
| 2,270,504 | Burk et al. | Jan. 20, 1942 |
| 2,475,155 | Rosenblatt | July 5, 1949 |
| 2,606,940 | Bailey et al. | Aug. 12, 1952 |
| 2,673,189 | Reynolds et al. | Mar. 23, 1954 |
| 2,771,463 | Field et al. | Nov. 20, 1956 |
| 2,773,053 | Field et al. | Dec. 4, 1956 |
| 2,794,056 | Winstrom | May 28, 1957 |
| 2,805,206 | John et al. | Sept. 3, 1957 |
| 2,852,474 | Arundale et al. | Sept. 16, 1958 |